Jan. 5, 1965    N. LEOPOLDI    3,164,180
EGG OPENING DEVICE
Filed Feb. 6, 1963
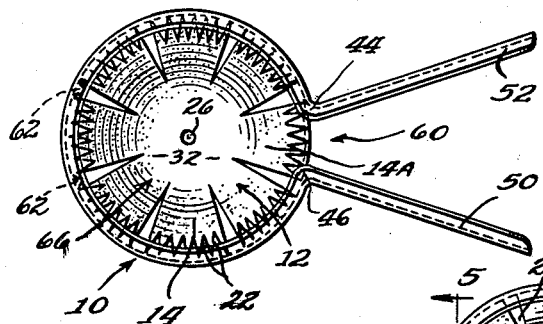
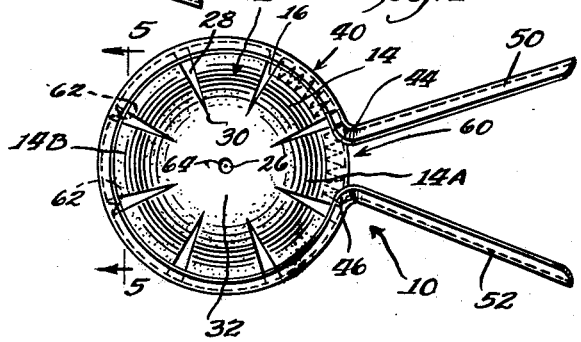
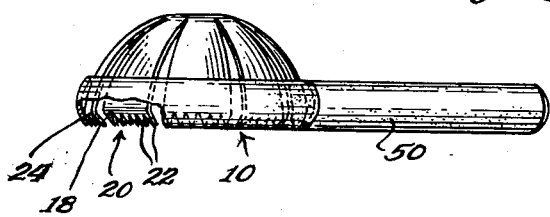
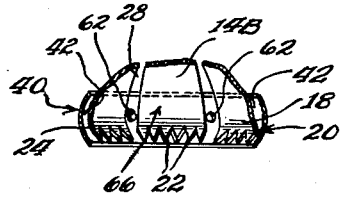
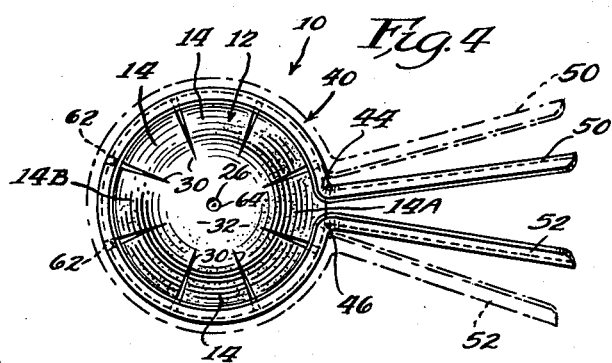
Inventor
Norbert Leopoldi
By Mann, Brown & McWilliams
Attys.

United States Patent Office 3,164,180
Patented Jan. 5, 1965

3,164,180
EGG OPENING DEVICE
Norbert Leopoldi, 4180 Marine Drive, Chicago, Ill.
Filed Feb. 6, 1963, Ser. No. 256,660
2 Claims. (Cl. 146—2)

My invention relates to an egg opening device, and more particularly to a device that is especially adapted to crack and remove one end of the shell from comestible eggs such as chicken eggs.

Chicken eggs are widely used as food, and a common way of preparing them for human consumption is to heat them with their shells on, either to the soft or hard "boiled" consistency, and then place them with the shell still in place in egg cups or the like for the individual to open and proceed to eat.

One of the long-standing difficulties in eating soft or hard boiled eggs lies in the removal of a sufficient portion of the shell to enable one to conveniently get at the egg albumen (or white) and yolk. Chicken egg shells are hard and brittle, and when fractured for purposes of removing one end of the shell, tend to crack uncontrollably and unpredictably, with the result that it is almost impossible to effect a clean cut removal of one end of the egg shell without disturbing the egg white, and frequently breaking the yolk. The inner shell lining that tends to cause shell fragments to adhere together even after the shell is cracked also complicates the removal process.

A principal object of this invention is to provide an egg cracking or opening device that will uniformly effect a clean separation of an egg-shell end from the remainder of the egg to expose an egg end for ready consumption.

Another important object of this invention is to provide a simplified egg opening device that is readily operated by even the most mechanically inexperienced persons.

Other objects of the invention are to provide an egg opening device that is adapted for mass production purposes, that is susceptible of wide consumer adoption and use, and that is economical of manufacture, convenient in use and adapted for application to all normal egg sizes.

Still other objects, uses and advantages will become obvious or be apparent from a consideration of the following detailed description and the application drawings.

In the drawings:

FIGURE 1 is a top plan view of a preferred embodiment of the invention;

FIGURE 2 is a bottom plan view of the device shown in FIGURE 1;

FIGURE 3 is a side elevational view of the device shown in FIGURES 1 and 2;

FIGURE 4 is a view similar to that of FIGURE 1, but shows the contracted egg shell cracking position of the device in full lines, with the position of FIGURE 1 being indicated in broken lines; and FIGURE 5 is a diagrammatic cross-sectional view substantially along line 5—5 of FIGURE 1.

However, it should be understood that the specific drawing illustrations provided are supplied for purposes of complying with the requirements of 35 U.S.C. 112, and that the invention is susceptible of other embodiments, as will be immediately apparent to those skilled in the art.

Reference numeral 10 of FIGURES 1–4 generally indicates a preferred embodiment of the invention, which comprises a cup-shaped egg engaging member 12 proportioned over one end of an egg and defining resilient fingers 14 that are separated from each other as at 16 along meridian lines of member 12, with the ends 18 of the respective fingers being formed as indicated at 20 in FIGURES 3 and 5 to define inwardly directed teeth or serrations 22 that lie along the rim 24 of the member 12.

The member 12 may be formed in any suitable manner from a resiliently flexible material such as a suitable sheet metal or plastic substance, whereby the respective teeth 14 are biased outwardly of the central axis 26 of member 12.

The member 12 as shown is substantially hemispherical in configuration, with the normal relation of fingers 14 being such that they are separated from each other somewhat by gaps 28 that extend from their points 30 of juncture with the end wall 32 of member 12 to the rim 24 of the member 12.

Received about the rim 24 of the member 12 is an open loop camming member 40 that is concavo-convex in transverse cross-sectional configuration (see FIGURE 5) and defines a concave spherically contoured camming surface 42 which engages the ends 18 of the fingers 14 about the rim 24 of the member 12. The camming member 40 is proportioned so that its ends 44 and 46 are spaced from, but positioned adjacent each other to give the camming member 40 a substantially annular configuration that substantially complements the generally rounded outline of the rim 24 of member 12.

The ends 44 and 46 of the camming member 40 are each provided with an outwardly projecting handle 50 and 52, respectively, which, as indicated in FIGURE 1, respectively lie substantially along radii of the member 12 in the unstressed position of device 10, and are disposed at an acute angle with respect to each other.

In the form shown, the member 40 and its handles 50 and 52 are integrally united to form a single element bent to the shape shown in FIGURES 1 and 2 to engage the rim of member 12 and provide handles 50 and 52 in the manner indicated. However, it is obvious that the camming member 40 and its handles 50 and 52 could comprise separate elements or components that are united in any suitable manner to provide the relationship indicated.

An important feature of this invention is that one of the fingers 14 of the egg engaging member 12 is positioned and proportioned to span the gap 60 between the end portions 44 and 46 of the camming member in all possible positions of that member. This relationship is shown in FIGURES 1, 2 and 4 where the particular finger 14 referred to is marked 14A.

It is also preferable that the member 12 be secured against rotation with respect to the camming member 40, and while this may be accomplished in various manners, in the embodiment illustrated, the camming member 40 is provided with a pair of protuberances, here illustrated as dimples 62, that project inwardly of the member 40 and are received on either side of the finger of member 12 marked 14B. The dimples 62 are thus received in the triangular shaped gaps 28 that separate the finger 14B from its adjacent fingers 14.

The mid portion of the member 12 may be provided with an opening or perforation 64 for purposes of hanging it on a wall or the like.

In operation, the device 10 is grasped in the fingers of one hand by appropriately gripping the handles 50 and 52 to dispose it substantially in the position shown in FIGURE 3 over an unshelled egg that has been placed in the usual egg cup so that its end extends upwardly. With the handles 50 and 52 disposed as shown in FIGURE 1, the device 10 is then lowered to position the egg end within the socket 66 defined by the member 12, after which the handles 50 and 52 are pressed toward each other, as indicated in FIGURE 4 to in turn draw the ends 44 and 46 of the camming member 40 towards each other, which contracts the member 40 against the finger ends 18 and cams them inwardly of the member 12 to bring the serrations or teeth 22 into engagement with the egg shell. Further movement of the handles 50 and 52 towards each other will force the teeth or serrations 22 into the egg shell, thereby fracturing same above the circular line of contact established by the teeth 22, after which the device 10 is lifted upwardly from the egg to lift the entire end of the egg shell upwardly from the upstanding egg end.

The handles 50 and 52 may then be released to release the egg shell end for disposal in any suitable manner. As a practical matter, after the egg shell has been removed, the camming member 40 may be held in its contracted position until the device 10 is disposed over a suitable trash container, after which it may be released to let the egg shell end drop into the container without having to touch same.

The result is that by using the device 10, the egg shell end is cleanly and neatly removed from the egg to leave exposed the desired egg contents.

It will be observed that the device 10 is adapted to operably engage eggs of various sizes, within reasonable limits, and the teeth or serrations 22 may be brought into contact with eggs of various sizes by appropriately compressing the handles 50 and 52 the amount found to be necessary under particular operating conditions.

It will also be immediately apparent that the device 10 can be adapted to open eggs of all sorts and origins. Where unusually large eggs are to be opened, the device 10 can be supplied in the larger size required to accommodate such eggs. Similar remarks apply to smaller size eggs. Thus, the device 10 is not limited for use only in connection with chicken eggs.

The camming member 40 may be formed from a suitable resiliently flexible material such as sheet metal, spring steel, or an appropriate plastic substance.

From what has been said, it should be immediately apparent that my egg opening device is readily adapted for wide adoption by the consumer, and that it is fully susceptible of the mass production methods that are required to achieve this end. This device obviously can be readily operated by anyone who is capable of processing the egg that is to be opened.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A device for opening eggs comprising:

a cup shaped, substantially hemispherically contoured, egg engaging member formed from resiliently flexible sheeting material and defining a substantially annular rim about its open end, said member open end being proportioned to be received over one end of an egg, said member being split along equally spaced meridian lines of said member from said rim thereof toward but short of the axial center of said member to define resilient fingers, said fingers at the portions thereof lying along said rim of said member being formed to define inwardly directed serrations with adjacent fingers being equally spaced at said portions thereof to permit movement of said serrations inwardly of the rim of said member, and an actuator device for releasably forcing said serrations of said finger portions against the egg, said actuator device comprising:

an open looped resiliently flexible camming member defining an arcuate portion that is received about said rim of said egg engaging member in camming engagement with said fingers, said camming member arcuate portion substantially complementing the rounded configuration of said egg engaging member rim and defining an inner concave spherically contoured camming surface that abuts said portions of said fingers, with the ends of said camming member portion being disposed in adjacent spaced relation and thereby defining a gap between said camming member portion ends, and handle means operably connected with said camming member portion ends for contracting said camming member against said finger portions to force said finger portion serrations against an egg when the latter is received within the rim of said egg engaging member, each of said fingers at said portions thereof being proportioned circumferentially of said rim to span the gap between said camming member ends in the extended and contracted portions of said camming member, with said egg engaging member being oriented with respect to said camming member to dispose one of said finger portions across said gap, said camming member defining a protuberance projecting into one of the spaces between two adjacent fingers of said fingers that are disposed substantially oppositely of said gap across said rim.

2. The device set forth in claim 1 wherein:

said egg engaging member is formed with a perforation at said axial center thereof, whereby said perforation may receive a projection to hang same from a support when said device is not in use.

References Cited in the file of this patent

UNITED STATES PATENTS

| | | |
|---|---|---|
| 1,203,891 | Markowitz | Nov. 7, 1916 |
| 2,394,250 | Mooss | Feb. 5, 1946 |